Figure 1:
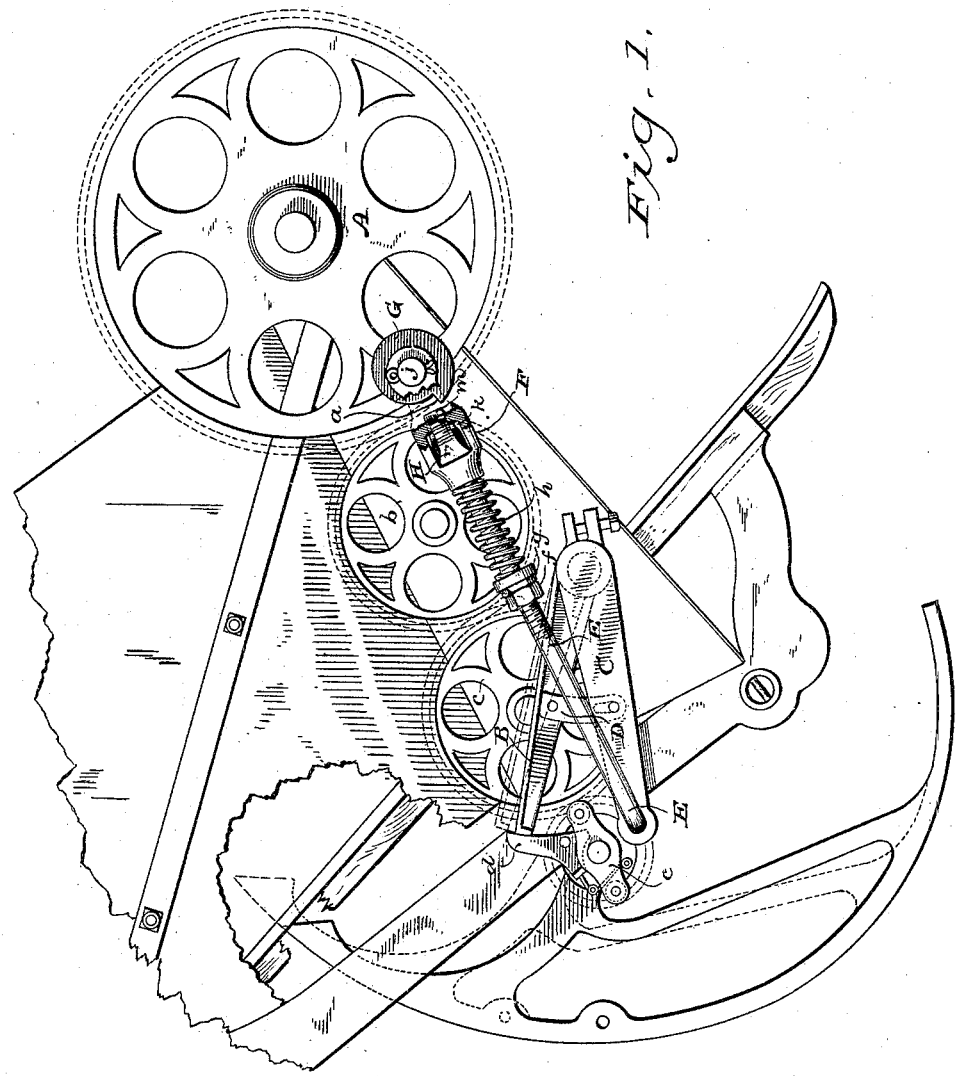

(No Model.) 2 Sheets—Sheet 1.
J. A. GRAHAM.
GRAIN BINDER.

No. 383,462. Patented May 29, 1888.

WITNESSES.
Geo. W. Young.
N. E. Oliphant

INVENTOR.
James A. Graham.
By Stout & Underwood
Attorneys.

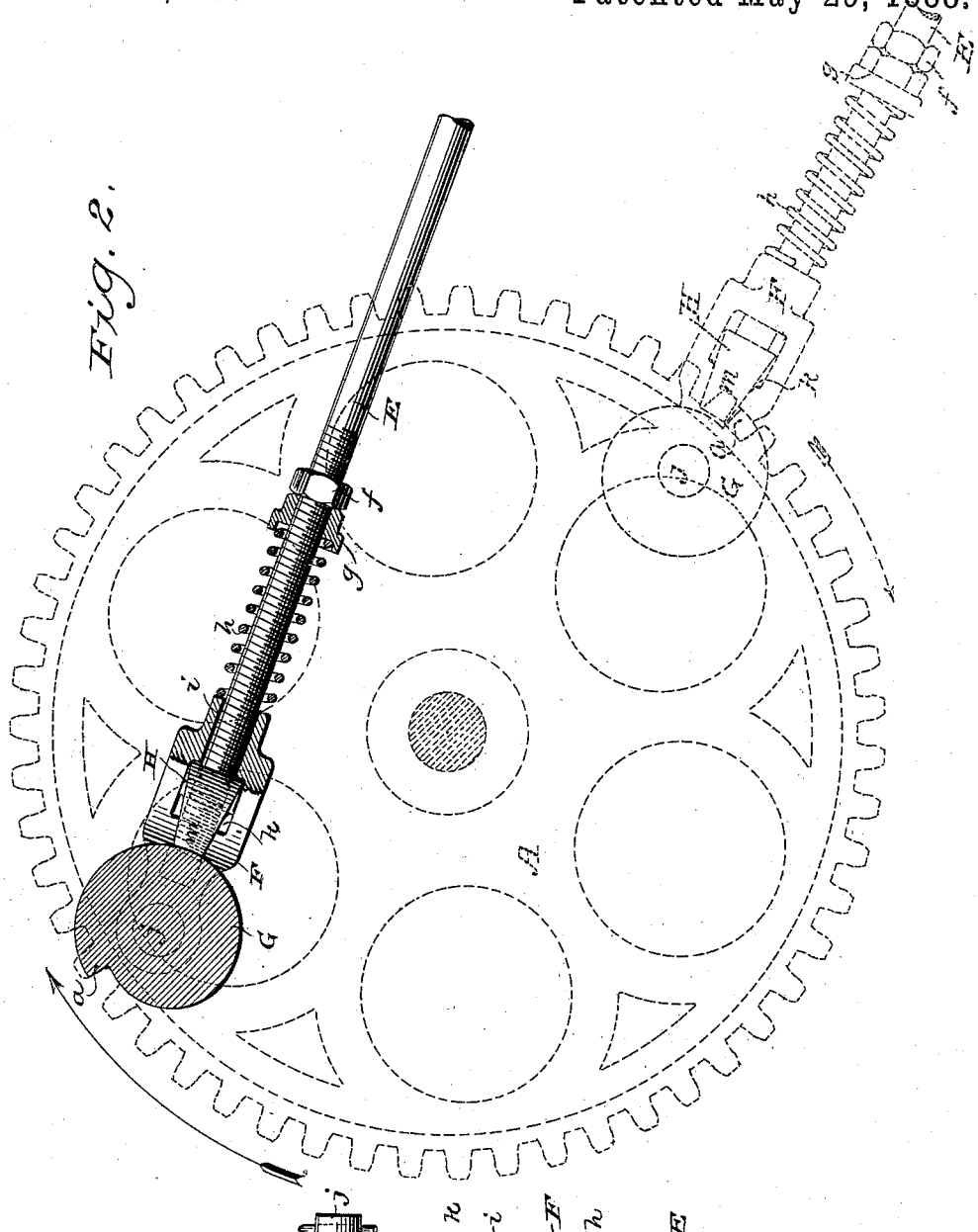

UNITED STATES PATENT OFFICE.

JAMES A. GRAHAM, OF MILWAUKEE, WISCONSIN, ASSIGNOR TO THE MILWAUKEE HARVESTER COMPANY.

GRAIN-BINDER.

SPECIFICATION forming part of Letters Patent No. 383,462, dated May 29, 1888.

Application filed September 28, 1886. Serial No. 214,717. (No model.)

*To all whom it may concern:*

Be it known that I, JAMES A. GRAHAM, of Milwaukee, in the county of Milwaukee, and in the State of Wisconsin, have invented certain new and useful Improvements in Grain-Binders; and I do hereby declare that the following is a full, clear, and exact description thereof.

My invention relates to grain-binders, and will be fully described hereinafter.

In the drawings, Figure 1 is an elevation of the gear side of a grain-binder embodying my invention. Fig. 2 is a section in full lines on line 2 2, Fig. 3, when the parts are in the position shown in Fig. 1, and also an elevation in dotted lines of the binder-wheel and a portion of needle-operating pitman, looking from the side of the binder-wheel opposite that shown in Fig. 1, and showing the position of the parts just after the binder has been tripped into gear. Fig. 3 is a detail section view.

A is the binder-wheel, and $b$ and $c$ are the gear-wheels that connect it with the driving-pinion.

$d$ is the pawl of the driving-clutch $e$.

B is the trip-stop.

C is the crank-arm of the needle-shaft, and D a link that connects the crank-arm with the trip-stop.

E is the pitman that connects the binder-wheel A with the crank-arm. This pitman E is screw-threaded toward the upper end to receive nuts $f$ $g$, which form a stop for a spring, $h$, and the screw-threaded end of pitman E is projected through an opening, $i$, in one end of a head, F, the outer end of which is wristed at $j$ to an eccentric cam-disk, G, on the outer face of the binder-wheel A.

The pitman E and head F are connected with each other by a nut, H, which is slipped into an opening, $k$, in the head F in position to receive the screw-threaded end of the pitman E, and this nut H is formed with a stop-arm, $m$, that stands at right angles to that part of it through which the pitman E passes, and is in position to receive the periphery of the cam projection or wheel G when the binder-wheel A is completing the last half of each revolution. The spring $h$ is compressed between the head F and nuts $f$ $g$, and hence its force is exerted against the head to take up lost motion as the binder-wheel revolves. While the head F and pitman have a yielding connection with each other, the attachment between the nut and pitman is rigid, except that said nut may be screwed in or out to cause it to impinge upon the periphery of the cam-wheel at the proper time in its revolution about the axis of the binder-wheel. The end of the pitman opposite the head F is wristed to the crank-arm C, and in the operation of my device, during the last half-revolution of the binder-wheel, the impingement of the periphery of cam-wheel G upon the stop $m$ of nut H renders the connection between the crank-arm and the pitman perfectly rigid, so that no amount of vibration of the machine will prevent the trip-stop from being carried into position to intercept the pawl $d$ and trip the machine out of gear at the proper time—that is, just before the binder-wheel completes a revolution—and then by the time the binder-wheel stops the stop $m$ of the nut clears the shoulder $a$ of the cam-wheel G and leaves the pitman free to be compressed by the crank-arm C when force is applied through the packers (not shown) and a completed gavel to give the initial movement to the compressor-shaft, that lifts its crank-arm C and carries the trip-arm out of engagement with pawl $d$.

In Fig. 2 the dotted representation of the pitman E and cam-wheel G shows the position of the nut and pitman just as the act of releasing pawl $d$ is taking place, and Fig. 3 shows the position of the parts when the binder is at rest and a gavel is being accumulated by the packers.

The time in the revolution of the binder-wheel A at which contact will be made between the stop-arm $m$ and the periphery of cam-disk G is regulated by screwing nut H in or out on pitman E; but no result is produced by such contact until after the binder-wheel begins the last half of its revolution, as up to that time there is draft on the pitman.

In tying a bundle, beginning with the parts in the position shown in Fig. 1, as the arm C is lifted by the needle-shaft it lifts trip-stop B and trips the machine into gear, when the binder-wheel begins to revolve and the wrist-pin $j$ draws upon pitman E, which in turn, through crank-arm C and the needle-shaft, operates the needle to carry its point into the knotter, (not shown,) and as the binder-wheel A completes the first half of its revolution the heavier portion of cam-disk G begins to make contact with the stop-arm m of nut H, and by taking up lost motion makes the connection between the binder-wheel and crank-arm C absolutely unyielding, thus preventing any return movement of the trip-stop and insuring its action at the proper time to throw the machine out of gear.

Having thus described my invention, what I claim as new, and desire to secure by Letters Patent, is—

In a grain-binder, the combination, with the binder-wheel and crank-arm of the needle-shaft, of an eccentric cam-disk carried by the binder-wheel, a pitman, a pitman-head wristed to the cam-disk aforesaid and having a yielding connection with the pitman, and a stop carried by the pitman and adapted for impingement on the periphery of the cam-disk during the last portion of each revolution of the binder-wheel, substantially as described.

In testimony that I claim the foregoing I have hereunto set my hand, at Milwaukee, in the county of Milwaukee and State of Wisconsin, in the presence of two witnesses.

JAMES A. GRAHAM.

Witnesses:
N. E. OLIPHANT,
MAURICE F. FREAR.